(12) United States Patent
Benton et al.

(10) Patent No.: US 7,511,934 B2
(45) Date of Patent: Mar. 31, 2009

(54) SYSTEM AND METHOD FOR CONDITIONING A POWER SUPPLY TRANSMISSION FOR SUPPLY TO A LOAD CIRCUIT

(75) Inventors: Andrew Benton, Flourtown, PA (US); Michael McCook, New Hope, PA (US)

(73) Assignee: Electronic Systems Protection, Inc.

( * ) Notice: Subject to any disclaimer, the term of this patent is extended or adjusted under 35 U.S.C. 154(b) by 32 days.

(21) Appl. No.: 11/293,669

(22) Filed: Dec. 2, 2005

(65) Prior Publication Data

US 2007/0127177 A1 Jun. 7, 2007

(51) Int. Cl.
H02H 3/20 (2006.01)

(52) U.S. Cl. ......................................... 361/90; 361/91.1

(58) Field of Classification Search .................... 361/90, 361/91.1
See application file for complete search history.

(56) References Cited

U.S. PATENT DOCUMENTS

| | | | | |
|---|---|---|---|---|
| 4,368,499 A | * | 1/1983 | Stifter | 361/90 |
| 4,870,528 A | | 9/1989 | Harford | |
| 5,506,790 A | * | 4/1996 | Nguyen | 700/286 |
| 5,930,130 A | | 7/1999 | Katyl | |
| 6,055,163 A | * | 4/2000 | Wagner et al. | 363/37 |
| 6,072,676 A | | 6/2000 | Tran et al. | |
| 6,185,082 B1 | * | 2/2001 | Yang | 361/90 |
| 6,400,539 B1 | | 6/2002 | Sekiguchi et al. | |
| 6,601,002 B1 | | 7/2003 | Ennis | |
| 6,683,770 B1 | | 1/2004 | Marsh | |
| 6,731,484 B2 | | 5/2004 | Pebles | |
| 6,751,079 B2 | | 6/2004 | Bretschneider | |
| 6,754,844 B1 | * | 6/2004 | Mitchell | 714/4 |
| 6,775,118 B2 | | 8/2004 | Hinterscher | |
| 6,775,121 B1 | | 8/2004 | Chaudhry | |
| 6,788,509 B2 | | 9/2004 | Brachmann | |
| 6,816,350 B1 | * | 11/2004 | Hoopes | 361/90 |
| 6,819,539 B1 | | 11/2004 | Wright | |
| 6,894,882 B2 | | 5/2005 | Maru | |
| 6,900,972 B1 | | 5/2005 | Chan | |
| 2003/0165035 A1 | * | 9/2003 | McCook et al. | 361/21 |
| 2004/0184208 A1 | | 9/2004 | Liu | |
| 2005/0105230 A1 | | 5/2005 | Bailey | |
| 2005/0141157 A1 | | 6/2005 | Okayama | |
| 2005/0190515 A1 | | 9/2005 | Hallak | |
| 2005/0195542 A1 | | 9/2005 | Kimura | |
| 2005/0213273 A1 | | 9/2005 | Wang | |

OTHER PUBLICATIONS

Paul Horowitz, The Art of Electronics, 2006, The Press Syndicate of the University of Cambridge, Second Edition, 231-232.*

* cited by examiner

*Primary Examiner*—Stephen W Jackson
*Assistant Examiner*—Tien Mai
(74) *Attorney, Agent, or Firm*—The Belles Group, P.C.

(57) ABSTRACT

A system and method for conditioning an alternating current ("AC") power transmission for supply to a load circuit. In one aspect, the invention is a system comprising: a power conditioning circuit comprising a voltage surge protector for eliminating voltage spikes in the AC power transmission, an inrush current suppressor for limiting the current of the AC power transmission, and a voltage sensing circuit for monitoring a voltage level of the AC power transmission; means for electrically coupling the power conditioning circuit to a source of AC power; outlet means for electrically coupling the power conditioning circuit to a load circuit; and wherein the voltage sensing circuit is adapted so that upon detecting that the voltage level of the AC power transmission exceeds a predetermined upper limit, the AC power transmission is prohibited from reaching the outlet means.

19 Claims, 7 Drawing Sheets

SYSTEM AND METHOD FOR CONDITIONING A POWER SUPPLY TRANSMISSION FOR SUPPLY TO A LOAD CIRCUIT

FIELD OF THE INVENTION

The present invention relates generally to the field of systems and methods for protecting electrical loads from transient surges in a source of alternating current ("AC") power. More specifically, the present invention relates to systems and methods for protecting electrical loads from transient surges in a source of AC power that removes adverse characteristics that may be present in the power transmission and provides an automatic disconnect upon detecting an overvoltage condition. Even more particularly, the present invention relates to systems and methods that provide voltage surge protection, in-rush current suppression, and/or overvoltage detection and disconnect to an AC power transmission.

BACKGROUND OF THE INVENTION

The prior art is replete with different types of devices and circuits that filter out undesired electrical characteristics from an incoming source of electricity. In the United States of America, most every home and business is supplied with power from a utility company. Typically, the power supplied from the utility company passes through a transformer and is supplied to a building with an alternating current of 120 volts and a nominal frequency of 60 Hz. Although the power at the utility company is generated at these voltages and frequency values, the actual power received at a particular home or business can vary widely depending upon both how the power is transmitted and how the power is used.

Power transmission lines emanating from utility companies are commonly exposed to the elements as they travel from the utility company to a home or business. As such, the power transmission lines are subject to lightning strikes, interference from sun flares, storm damage and the like. All of these occurrences can create abnormalities in the characteristics of the power being transmitted. For example, a lightning strike in a power transmission line can create a large voltage spike in the power being transmitted. If this voltage spike is received by a home or business, the voltage spike can cause catastrophic damage to any electronic load/equipment that receives it. Alternatively, power can be disrupted if the spike causes a circuit breaker to trip.

Similarly, power transmission lines can receive electromagnetic interference (EMI) and/or radio frequency interference (RFI) from natural and manmade sources. The resulting EMI/RFI signals cause noise in the characteristics of the power transmission that can disrupt sensitive electronic circuits that receive such power transmissions.

Power transmissions with undesirable characteristics can also be created by the way power is used in a home or business. Many electronic devices draw a higher current when they are first turned on. This is because the circuits in the electronic device/load are cold and the capacitors in the circuits are not charged. However, soon after the circuit is powered, the current drawn by that circuit can decrease dramatically. As a result, when an electronic device is first turned on, there is an inrush of current, thereby causing a current spike. If multiple electrical devices are all turned on at once, the inrush current spike can be quite large and either cause a circuit breaker to trip or cause damage to the electronic components of those devices that experience the current spike.

Additional undesirable characteristics experienced in power transmission are that of overvoltage and/or undervoltage conditions. An overvoltage condition is a hazardous condition that exists when the voltage of the incoming power is raised over a safe operating upper limit. Similarly, an undervoltage condition is a hazardous condition that exists when the voltage of the incoming power is lowered below a safe operating lower limit. Depending on the duration, the under/overvoltage event can be permanent or last for a substantial period of time. Because of the prolonged nature of an under/overvoltage condition, circuitry designed to merely protect against transient surges is inadequate.

In the prior art, there are many different devices that are used to eliminate adverse characteristics from a power supply. However, many of these devices are designed to filter out only one type of adverse characteristic. For example, there are many types of commercially available surge protector items that can eliminate voltage spikes caused by lightning. Such prior art surge protectors are exemplified U.S. Pat. No. 4,870,534 to Harford ("the '534 Patent"), entitled Power Line Surge Protector, the entirety of which is incorporated herein by reference. However, such prior art surge protection devices do not protect from EMI/RFI signal interference, incidents of inrush current, or the occurrence of under/over voltage conditions.

Similarly, devices exist in the prior art record that are designed to filter EMI/RFI signal interference from power supplies. Such prior art filters are exemplified by U.S. Pat. No. 5,530,396 to Vlatkovic, entitled EMI Input Filter Power Factor Correction Circuits, the entirety of which is incorporated herein by reference. However, such prior art devices do not protect against voltage surges, inrush current surges, or the occurrence of under/over voltage conditions.

Moreover, devices exist in the prior art that are designed to eliminate inrush current surges. Such prior art devices are exemplified by U.S. Pat. No. 4,573,113 to Bauman, entitled Surge Protection System For A D-C Power Supply During Power-up, and U.S. Pat. No. 5,930,130 to Katyl, entitled Inrush Protection Circuit, the entirety of which is incorporated herein by reference. However, such prior art devices do not protect against EMI/RFI signal interference, voltage surges, or the occurrence of under/over voltage conditions.

To date, the most complete system and method for conditioning power received from an AC power supply source and supplying the conditioned AC power to the electronic load/equipment is disclosed in U.S. Pat. No. 6,744,613 to McCook et al. ("the '613 Patent"), entitled System and Method for Filtering Multiple Characteristics from a Power Supply Source, the entirety of which is hereby incorporated by reference in its entirety. While the device disclosed in the '613 Patent provides combined protection against EMI/FRI interference, inrush currents, and transient voltage surges, it does not provide adequate protection against overvoltage and/or undervoltage power conditions.

Finally, while circuits do exists that generally provide protection against over/undervoltage conditions, these circuits are limited to protecting components in direct current ("DC") circuitry. Such circuits are not easily conformable to devices that receive, condition, and pass along AC power. Thus, the need still exists for a system and method for conditioning power from AC power supply source that can also provide protection from over/undervoltage conditions.

SUMMARY OF THE INVENTION

It is therefore an object of the present invention to provide a system and method for conditioning AC power.

Another object of the present invention is to provide a system and method for conditioning AC power that can remove multiple adverse characteristics from the AC power.

Yet another object of the present invention is to provide a system and method for conditioning AC power that can provide effective protection to a load circuit from an overvoltage and/or an undervoltage condition.

Still another object of the present invention is to provide a system and method for conditioning AC power that can detect an overvoltage and/or an undervoltage condition and prohibit the AC power supply to the load circuit for the duration the overvoltage and/or an undervoltage condition.

A further object of the present invention is to provide a system and method for conditioning AC power that can detect an overvoltage and/or an undervoltage condition, automatically disconnect the load circuit from the AC power supply source upon detection of the overvoltage and/or an undervoltage condition, and automatically reconnect the load circuit to the AC power supply source upon detecting that the overvoltage and/or an undervoltage condition has ended.

A still further object of the present invention is to provide a system and method for conditioning AC power that can provide effective protection to a load circuit from transient surges, inrush currents, and/or overvoltage conditions.

Another object of the present invention is to provide a system and method for conditioning AC power that can provide effective protection to a load circuit from transient surges, inrush currents, EMI/RFI interference, and/or overvoltage conditions. These and other objects are met by the present invention, which in one aspect is a system for conditioning an incoming alternating current ("AC") power transmission for supply to a load circuit. The inventive system comprises a power conditioning circuit, means for electrically coupling the power conditioning circuit to a source of AC power, and outlet means for electrically coupling the power conditioning circuit to a load circuit. The power conditioning circuit comprises a voltage surge protector, an inrush current suppressor, and a voltage sensing circuit.

The voltage surge protector eliminates voltage spikes in the AC power transmission. The inrush current suppressor limits the current associated with the AC power transmission. The overvoltage sensing circuit monitors the voltage level of the AC power transmission. When the voltage sensing circuit detects that the voltage level of the AC power transmission exceeds a predetermined upper limit, the AC power transmission is prohibited from reaching the outlet means. Thus, the circuit load is automatically protected from the overvoltage condition.

In one preferred embodiment, the inventive system can also be designed to protect the load circuit from undervoltage conditions. In this embodiment, the voltage sensing circuit is adapted to generate and transmit an undervoltage signal to the controller when the voltage level of the AC power transmission drops below a predetermined lower limit. Upon receiving the undervoltage signal from the voltage sensing circuit, the controller transmits a disconnect signal to the one or more switches, thereby manipulating the switches so as to prohibit the AC power transmission from reaching the outlet means.

It is further preferred, in one embodiment, that the voltage sensing circuit continue to monitor the voltage level of the AC power transmission after the voltage level of the AC power is determined to exceed the predetermined upper limit or be below the lower limit. Thereafter, upon the voltage sensing circuit detecting that the voltage level of the AC power transmission returns to a value between the predetermined upper limit and the predetermined lower limit, the AC power transmission is automatically restored to the outlet means.

The AC power transmission can be prohibited from reaching the outlet means through the control of one or more switches. In such an embodiment, a controller is preferably operably coupled to the voltage sensing circuit and the one or more switches. The voltage sensing circuit generates and transmits an overvoltage signal to the controller upon detecting that the voltage level of the AC power transmission exceeds a predetermined upper limit. Upon receiving the overvoltage signal from the voltage sensing circuit, the controller transmits a disconnect signal to the one or more switches, thereby manipulating the switches so as to prohibit the AC power transmission from reaching the outlet means.

In one embodiment, the relay switches within the inrush current suppressor can also be used to perform the disconnect function(s). By utilizing the relay switches of the inrush current suppressor to also perform the disconnect function(s), the overall cost and complexity of the circuit is reduced.

In other embodiments, the system can further comprise: (1) a converter for creating direct current ("DC") power from the AC power transmission, the converter operably coupled to the controller for supplying DC power to the controller; (2) a remote activation unit coupled to the controller; (3) a filter for reducing electromagnetic interference and radio frequency interference of the AC power transmission.; and/or (4) means for coupling the power conditioning circuit to a network, thereby facilitating monitoring and/or control of the power conditioning circuit from a remote location.

As will be understood by those skilled in the art, the order in which the components of the above system are coupled to one another is not limiting of the present invention can be varied as desired. However, in one preferred embodiment, the voltage surge protector is coupled directly to the means for electrically coupling the power conditioning circuit to a source of AC power, thereby producing a surge protected AC power transmission. The EMI/RFI filter is located after the voltage surge protector, thereby receiving the surge protected AC power transmission and outputting a filtered AC power transmission. The filtered AC power transmission is received by the inrush suppressor and converted into a conditioned AC power transmission. The voltage sensing circuit can be coupled to the EMI/RFI filter and the controller. The controller is then coupled to the inrush current suppressor.

In another aspect, the invention can be a system for conditioning an incoming AC power transmission for supply to a load circuit, the system comprising: a voltage surge protector for eliminating voltage spikes in the incoming AC power transmission, thereby producing a surge protected AC power transmission; an inrush current suppressor that receives the surge protected AC power transmission and limits the current associated with the surge protected AC power transmission, thereby producing a conditioned AC power transmission; an voltage sensing circuit that receives the surge protected AC power transmission and monitors a voltage level of the surge protected AC power transmission, the voltage sensing circuit adapted to generate and transmit an overvoltage signal when the voltage level of the surge protected AC power transmission is determined to exceed a predetermined threshold; and a controller operably coupled to the voltage sensing circuit and the inrush current suppressor, wherein upon receiving the overvoltage signal from the voltage sensing circuit, the controller transmits a disconnect signal to one or more switches, thereby prohibiting the production of the conditioned AC power transmission.

In yet another aspect, the invention can be a system for conditioning an AC power transmission for supply to a load circuit, the system comprising: a power conditioning circuit comprising a voltage surge protector for eliminating voltage spikes in the AC power transmission, an inrush current suppressor for limiting the current of the AC power transmission, a voltage sensing circuit for monitoring a voltage level of the AC power transmission, one or more switches, and a controller operably coupled to the voltage sensing circuit and the one or more switches; means for electrically coupling the power conditioning circuit to a source of AC power; outlet means for electrically coupling the power conditioning circuit to a load circuit; and the voltage sensing circuit generating and transmitting an overvoltage signal to the controller when the voltage level of the AC power transmission exceeds a predetermined upper limit; and wherein upon receiving the overvoltage signal from the voltage sensing circuit, the controller transmits a disconnect signal to the one or more switches, thereby prohibiting the AC power transmission from reaching the outlet means.

In still another aspect, the invention can be a system for conditioning an AC power transmission for supply to a load circuit, the system comprising: a power conditioning circuit comprising a voltage surge protector for eliminating voltage spikes in the AC power transmission and an inrush current suppressor for limiting the current of the AC power transmission; means for coupling the power conditioning circuit to a network thereby facilitating monitoring and/or control of the power conditioning circuit from a remote location; means for electrically coupling the power conditioning circuit to a source of AC power; and outlet means for electrically coupling the power conditioning circuit to a load circuit.

In a further aspect, the invention can be a system for conditioning an AC power transmission for supply to a load circuit, the system comprising: a power conditioning circuit comprising a voltage surge protector for eliminating voltage spikes in the AC power transmission and a voltage sensing circuit for monitoring a voltage level of the AC power transmission; means for coupling the power conditioning circuit to a network thereby facilitating monitoring and/or control of the power conditioning circuit from a remote location; means for electrically coupling the power conditioning circuit to a source of AC power; outlet means for electrically coupling the power conditioning circuit to a load circuit; and wherein the voltage sensing circuit is adapted so that upon detecting that the voltage level of the AC power transmission exceeds a predetermined upper limit, the AC power transmission is prohibited from reaching the outlet means.

Any of the inventive systems can be modified to include any one, or any combination, of the additional electrical components discussed in detail above and described in the following specification.

In a still further aspect, the invention can be a method of conditioning an AC power transmission for supply to a load circuit, the system comprising: a) receiving an unconditioned AC power transmission from an AC power supply source; b) eliminating voltage spikes in the AC power transmission and limiting the current of the AC power transmission, thereby creating a conditioned AC power transmission; c) transmitting the conditioned AC power transmission to the load circuit; d) measuring a voltage level of the unconditioned AC power transmission or the conditioned AC power transmission; and e) disconnecting the transmission of the conditioned AC power transmission to the load circuit upon detecting that the voltage level exceeds a predetermined upper limit.

DETAILED DESCRIPTION OF THE DRAWINGS

Figure 1:
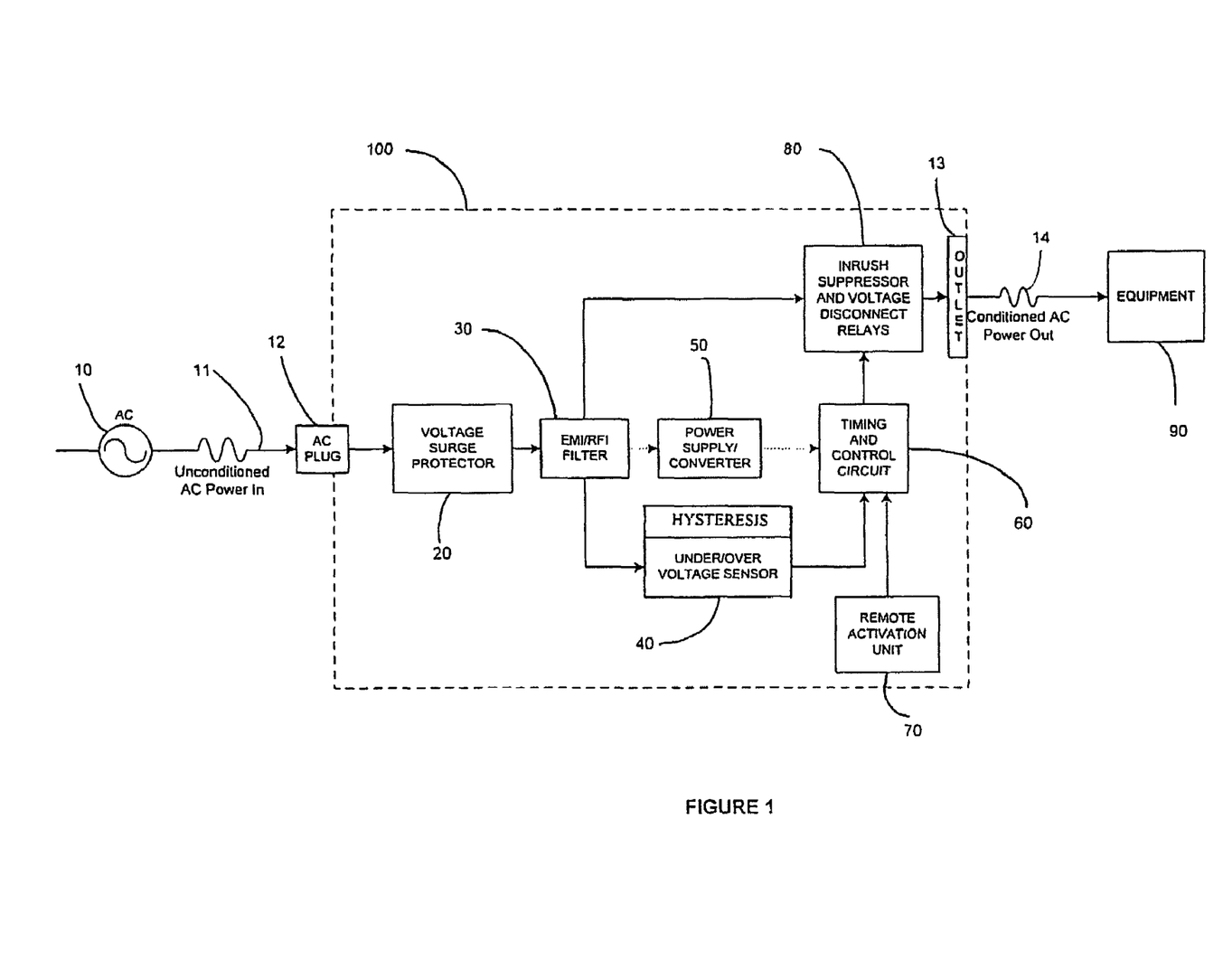
FIG. 1 is a schematic of a power conditioning system according to one embodiment of the present invention coupled to an alternating current power source and a piece of equipment.

FIG. 1 discloses a power conditioning system 100 according to one embodiment of the present invention. While the power conditioning system 100 can be incorporated directly into the internal circuitry and/or housing of many different types of electronic equipment, the power conditioning system 100 is particularly well suited for use as a self-contained unit. In this manner, the present invention power conditioning system 100 will comprise a separate housing that will contain the circuitry described in FIGS. 1-7. As such, the power conditioning system 100 can be used to condition incoming AC electrical power and any separate electronic device/load circuit can then be connected to the power conditioning system 100 to receive the conditioned power. Accordingly, in the exemplary embodiment of the present invention, the power conditioning system 100 is shown as a self-contained unit that is separate from the electronic equipment that receives electrical power through the power conditioning system.

The power conditioning system 100 is shown coupled to a source of AC power 10 via a plug 12 at one end and to a piece of electrical equipment 90 via an output port 13 at the other end. In one embodiment, the plug 12 extends from the housing of the power conditioning system 100 and is soldered, or otherwise electrically coupled, to the power conditioning circuitry located within the housing. In an alternative embodiment, a power jack/port can be provided in the housing for operably receiving and electrically coupling to a connector at an end of the plug 12. The power jack/port is in turn directly coupled to the power conditioning circuitry located within the housing.

The source of AC power 10 can be a standard 120 volt outlet/receptacle in one's home or business, which in turn is operably coupled to utility power lines and receives AC power from the local utility company. Unconditioned AC power 11 is supplied to the power conditioning system 100 via the plug 12. Upon receiving the unconditioned AC power 11, a power conditioning circuit within the housing of the power conditioning system 100 removes adverse characteristics that may be present in the incoming AC power transmission, monitors the voltage level of the AC power transmission, and presents a conditioned AC power transmission to the output port 13. In the illustrated embodiment, the output port 13 is a single receptacle that supplies filtered power to a single piece of electrical equipment 90 that is plugged into the power conditioning system 100.

Of course, the invention is not so limited. For example, a plurality of receptacles can be provided in the housing of so that multiple pieces of electrical equipment can be electrically coupled and protected simultaneously by a single power conditioning system 100. Moreover, in an alternative embodiment, the output port 13 can be the circuit breaker box of a building, thereby providing conditioned AC power to every receptacle in the building.

Importantly, the power conditioning system 100 comprises a power conditioning circuit comprising a voltage surge protector 20, an EMI/RFI filter 30, an over/undervoltage sensing circuit 40 (which includes a hysterisis circuit), a low volt DC power supply 50, a control circuit 60, a remote activation unit 70, and an inrush current suppressor 80. These components are electrically connected as shown in FIG. 1, wherein the electrical connections and direction of electrical flow are indicated by the arrows. The internal elements and functions of each component of the power conditioning circuit are described below in detail with respect to FIGS. 2-6. However, a high level description of the power conditioning circuit and its functioning is useful at this time.

Referring still to FIG. 1, the plug 12 is electrically connected to the voltage surge protector 20. Thus, as the plug 12 receives an unconditioned AC power transmission 11 from the AC power source 10, this unconditioned AC power transmission 11 is first received by the voltage surge protector 20. The voltage surge protector circuit 20 eliminates transient voltage spikes in the incoming unconditioned AC power transmission 11 that may be caused by lightning strikes, shorted transformers or the like, and outputs a surge protected AC power transmission. In the prior art, there exist many different types of voltage surge protector circuits that can eliminate voltage spikes. Many of these prior art circuits can be adapted for use in the present invention. However, the surge protector circuitry found in U.S. Pat. No. 4,870,528 to Harford, entitled Power Line Surge Protector is particularly advantageous and is preferred in the exemplary embodiment of the invention. Accordingly, the disclosure of U.S. Pat. No. 4,870,528 to Harford is hereby incorporated into this specification by reference.

The output leads of the voltage surge protector 20 are electrically coupled to the EMI/RFI filter 30. As a result, the surge protected AC power transmission outputted by the voltage surge protector 20 is received by the EMI/RFI filter 30. Due to the presence of the voltage surge protector 20, any transient voltage spikes in the received power signal have been removed. However, EMI and/or RFI signal noise can still be present in the incoming surge protected AC power transmission. The EMI/RFI filter 30 reduces the noise present in the surge protected AC power transmission that can be categorized as either electromagnetic interference or radio frequency interference, thereby outputting a filtered AC power transmission. In the prior art, there exist many types of EMI/RFI filters. Many of these prior art filters can be adapted for use as part of the present invention power condition system 100. However, a specific EMI/RFI filter 30 is preferred in the exemplary embodiment. This circuit will later be described with reference to FIG. 2.

The output leads of the EMI/RFI filter 30 are coupled to the inrush current suppressor 80. As a result, the filtered AC power transmission is then transmitted to the inrush current suppressor 80 for further conditioning as will be discussed below. The inrush current suppressor 80 acts as the third power conditioning component of the present invention, limiting the current of the filtered AC power transmission and outputting a conditioned AC power transmission to the output port 13. While one inrush current suppressor is illustrated, it is possible to utilize a plurality of the inrush current suppressors 80 if desired. For example, multiple inrush current suppressors can be arranged in a cascading array. As such, each of inrush current suppressors will be activated after the previous inrush current suppressor has finished powering up. In this manner, separated groupings of electronic equipment can be kept on the same circuit without surpassing the amperage rating for that circuit when the various groupings of equipment are first turned on.

The EMI/RFI filter 30 is also operably coupled to the low volt DC power supply 50 and the under/overvoltage sensing circuit 40. The under/overvoltage sensing circuit 40 continuously monitors the voltage level of the filtered AC power transmission that exits the EMI/RFI filter 30. Upon the under/overvoltage sensing circuit 40 detecting that the voltage level of the filtered AC power transmission either (1) exceeds a predetermined upper limit or (2) falls below a predetermined lower limit, the under/overvoltage sensing circuit 40 will generate and transmit a fault signal to the control circuit 60. In the event of an overvoltage condition, the under/overvoltage sensing circuit 40 will generate and transmit an overvoltage signal to the control circuit 60. Similarly, in the event of an undervoltage condition, the under/overvoltage sensing circuit 40 will generate and transmit an undervoltage signal to the control circuit 60.

Upon receiving the fault signal from the under/overvoltage sensing circuit 40, the control circuit 60 will send a disconnect signal to the inrush current suppressor 80, thereby causing the relay switches within the inrush current suppressor 80 to be opened such that the AC power transmission is disconnected and cut off from the output port 13. As a result, the electronic equipment 90 (i.e., the load circuit) is protected from overvoltage and/or undervoltage conditions.

While it is preferred that the control circuit utilize the relay switches within the inrush current suppressor 80 to disconnect the AC power transmission from the equipment 90, the invention is not so limited: For example, an additional switch (or set of switches) may be provided anywhere along the transmission path to perform the disconnect function. While these switches can be provided anywhere in the transmission path, it is preferred that they are located downstream of the location where the under/overvoltage sensing circuit 40 monitors the voltage level of the AC power transmission.

The under/overvoltage sensing circuit 40 continues to monitor the voltage level of the filtered AC power transmission even after the control circuit has disconnected the AC power transmission from the equipment 90. Upon detecting that the voltage level of the filtered AC power transmission returns to a safe operating level (i.e., between the predetermined upper and lower limits) the under/overvoltage sensing circuit 40 generates and transmits the appropriate reconnect signal to the control circuit 60. Upon receiving the reconnect signal, the control circuit 60 takes the appropriate action to reconnect the AC power transmission to the output port 13. In the preferred embodiment, this is accomplished by closing the appropriate relay switches within the inrush current suppressor 80. In one preferred embodiment, the sensing circuit 40 will comprise a hysteresis circuit 340 (FIG. 4) that provides hysteresis of 7.5 volts to prevent repetitive disconnection and reconnection of the AC power transmission to the output port 13.

All of the disconnect and reconnect functions are performed automatically by the power conditioning system 100. The timing of all actions are also controlled by the control circuit 60. It should also be noted that while it is preferred that the voltage sensing circuit 40 be designed to detect and react to both overvoltage and undervoltage conditions in the AC power transmission, the invention is not so limited. In some embodiments of the invention, the voltage sensing circuit 40 may only detect and react to overvoltage conditions. In other embodiment, while less preferable, the voltage sensing circuit 40 may only detect and react to the undervoltage conditions.

The power supply 50 is used to power the control circuit 60. Specifically, the power supply 50 is coupled to the outlet leads of the EMI/RFI filter 30 so that it can convert the filtered AC power transmission into low volt D.C. power. This low volt D.C. power is then supplied to the control circuit 60.

The control circuit 60 is also operably coupled to a remote activation unit 30. The remote activation unit 30 enables the selective activation/control of the inrush current suppressor 80 when needed and/or desired.

Finally, the order in which the components 20, 30, 40, 50, 60, 70 and 80 are arranged within the power conditioning circuit is not limiting of the present invention. While the preferred order is illustrated for ease of description and understanding, those skilled in the art will appreciate that the components 20, 30, 40, 50, 60, 70 and 80 can be arranged in a wide variety of orders and sequences to achieve an equivalent system Many of the components 20, 30, 40, 50, 60, 70 and 80 can be combined or further broken down on different circuit boards. The invention is not limited to any specific physical location of the components 20, 30, 40, 50, 60, 70 and/or 80 on circuit boards. In other embodiments of the present invention, one or more of the components 20, 30, 40, 50, 60, 70 and/or 80 may be omitted. The internal elements and functions of each component of the power conditioning circuit will now be described below in detail with respect to FIGS. 2-6.

Figure 2:
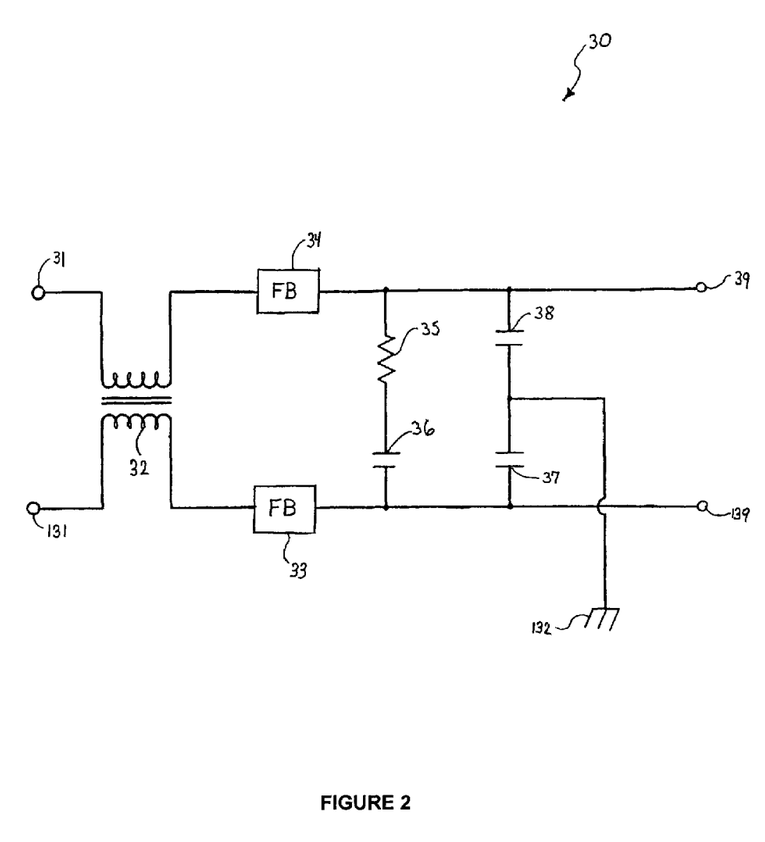
FIG. 2 is a schematic of an exemplary EMI/RFI filter for use in the power conditioning system of FIG. 1 according to one embodiment of the present invention.

Referring now to FIG. 2, an exemplary EMI/RFI filter 20 for use in the power conditioning system 100 is illustrated according to one embodiment of the present invention. The normal-mode and common-mode EMI/RFI filter 30 receives an AC power transmission at the inputs 31, 131. A mutual inductor 32 functions so as to allow the normal 60 Hz AC power transmission to pass therethrough with virtually no attenuation but presents impedance to common-mode EMI and RFI, thus attenuating these unwanted signals. The two ferrite beads 33, 34 are connected to the mutual inductor 32 and serve two purposes. The first purpose of the ferrite beads 33, 34 is to add series impedance to EMI and RFI, thereby further attenuating these signals. The second purpose of the ferrite beads 33, 34 is to prevent the filter circuit 30 itself from ringing with mismatched input and output impedances, and to help control filter characteristics.

A first capacitor 36 and a first resistor 35 are connected in series to the ferrite beads 33, 34 and provide a low impedance path for normal-mode EMI and RFI, thereby attenuating these unwanted signals. The first resistor 35 is a low value which is carefully chosen to control the Q of the filter circuit 30 and prevent it from ringing under impulse conditions. The first and second capacitors 37, 38 are connected in series between the output terminals 139 and 39 and the chassis ground 132. These capacitors 37, 38 provide a low impedance path to the chassis ground 132 for common-mode EMI and RFI, thereby further attenuating these unwanted signals.

Figure 3:
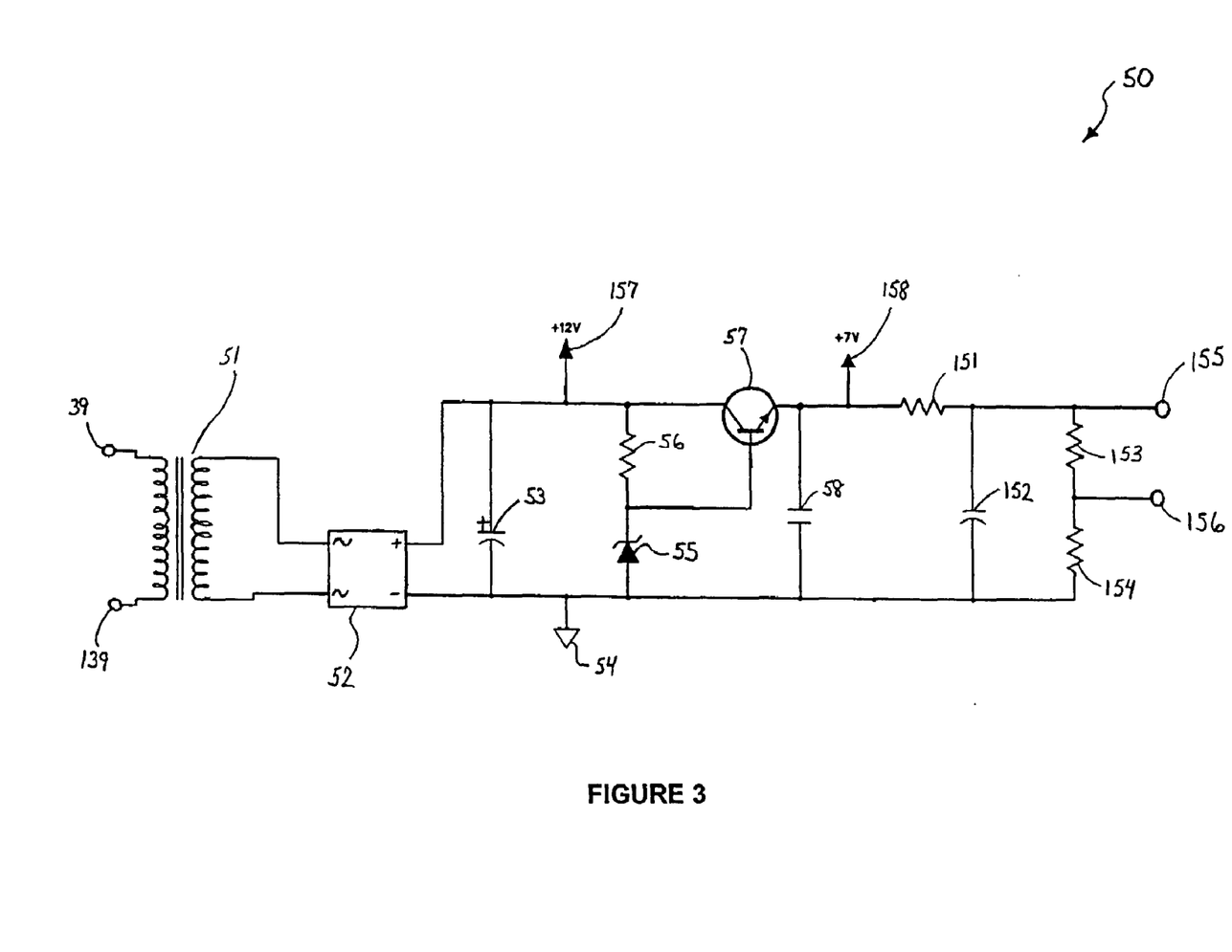
FIG. 3 is a schematic of an exemplary power supply/converter circuit for use in the power conditioning system of FIG. 1 according to one embodiment of the present invention.

Referring now to FIG. 3, an exemplary power supply/converter circuit 50 for use in the power conditioning system 100 is illustrated according to one embodiment of the present invention. The power supply circuit 50 provides DC power to the sensing circuit 40, timing and control circuit 60, remote activation unit 70, and the IP control circuit (illustrated in the embodiment of FIG. 7). The power supply circuit 50 is capable of operating with a wide range of AC voltages, but preferably with at least 90 volts to 300 volts.

The power supply circuit 50 comprises a transformer 51 which is connected to the input terminals 39, 139 which receive the AC power transmission. The output of the transformer 51 provides a nominal 12 volts AC to a bridge rectifier 52. The bridge rectifier 52 rectifies the AC to provide DC which is stored by a smoothing capacitor 53. The nominal 12 volts DC on smoothing capacitor 53 powers all of the circuitry of the power conditioning system 100 which requires 12 volts, including the five relays 49, 82, 83, 84 and 168. The power supply circuit 50 also comprises a 7.5 volt Zener diode 55 that provides a reference voltage for a regulator transistor 57. A resistor 56 supplies the reference diode 55 with a supply of current. The base of the transistor 57 is connected to the junction of the resistor 56 and the zener diode 55 and is supplied with 7.5 volts. The emitter of transistor 57 will be approximately 0.6 to 0.7 volts below the base and therefore supply a steady nominal 7 volts DC to the circuitry that requires 7 volts DC, including the timing and control circuitry 60, the remote activation unit 70, and the IP control circuitry (see FIG. 7). A capacitor 58 is provided to decouple the output of the 7 volt power supply. The resistors 151, 153 and 154 form a voltage divider to provide a reference voltage at each of the two ports 155 and 156 for the timing and control circuit 60. A capacitor 152 provides decoupling and stability for the two reference voltages.

Figure 4:
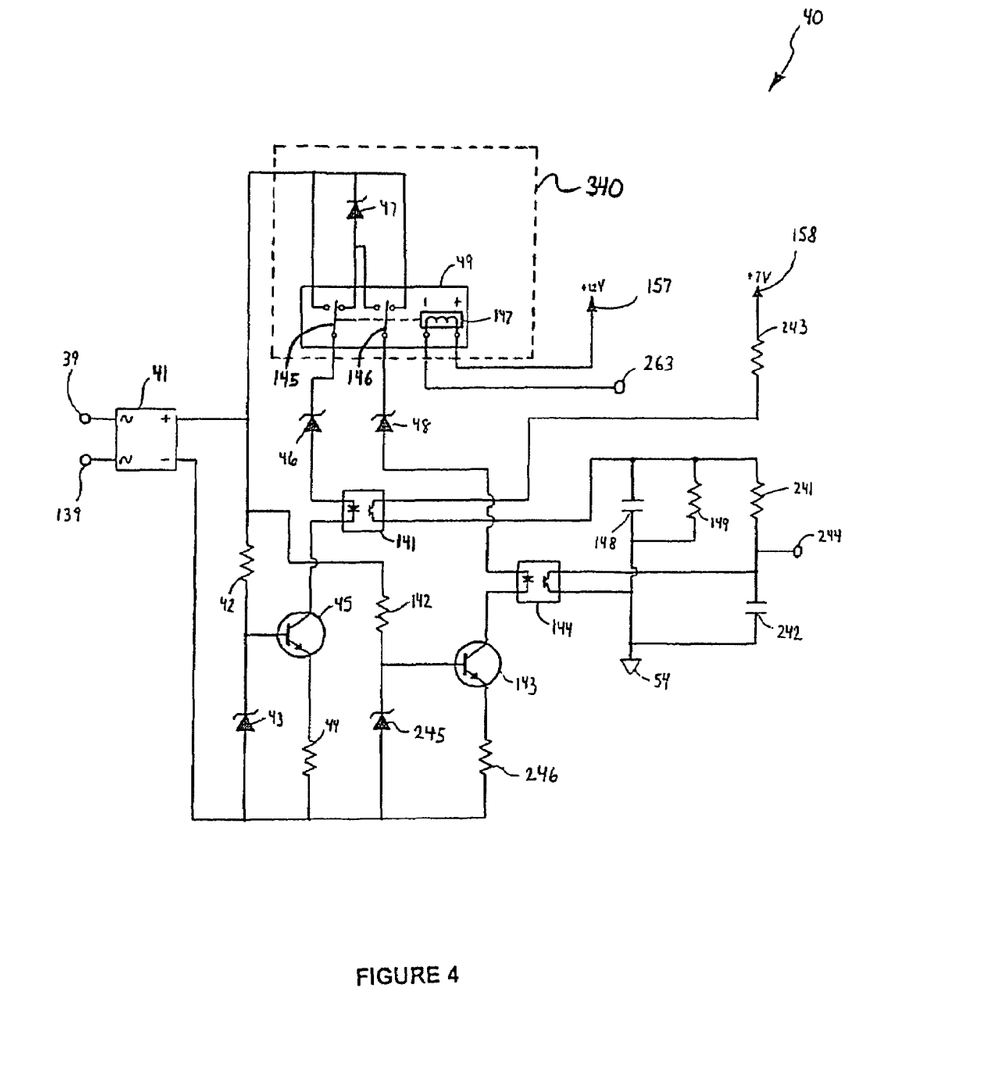
FIG. 4 is a schematic of an exemplary under/over voltage sensing circuit for use in the power conditioning system of FIG. 1 according to one embodiment of the present invention.

Referring now to FIG. 4, an exemplary under/over voltage sensing circuit 40 for use in the power conditioning system 100 is illustrated according to one embodiment of the present invention. A bridge rectifier 41 is connected to the 120 volt AC terminals 39 and 139. The bridge rectifier 41 provides rectified AC which powers the sensing circuit 40. The purpose of the sensing circuit 40 is to measure the AC voltage being supplied through the power conditioning system 100 (and eventually to the load 90) and to provide a signal at the output terminal 244 when the AC voltage is within a predetermined lower limit and a predetermined upper limit as discussed in greater detail above with respect to FIG. 1. Whether the sensing circuit 40 sends the signal when the AC voltage is measured to be within the predetermined range, or when the AC voltage is measured to be outside the predetermined range, is of no consequence and both aspects are considered to be within the scope of the present invention.

In one preferred embodiment, the sensing circuit 40 is designed to provide the appropriate signal when the AC voltage is between 90 and 145 volts RMS. In other words the upper limit is approximately 145 volts RMS and the lower limit is approximately 90 volts RMS. Of course the invention is not so limited and the any desired upper and lower voltage limits can be used.

The sensing circuit 40 provides the necessary over/under voltage signal, in part, through the use of two zener diodes 46, 48 which are chosen to break down at 90 and 145 volts respectively. As mentioned above, these voltages are the preferred thresholds for the undervoltage shutdown condition and the overvoltage shutdown condition respectively. A transistor 45 in combination with the 7.5 volt zener diode 43, the resistor 42, and the resistor 44 form a constant-current source as does a transistor 143 in combination with the 7.5 volt zener diode 245, the resistor 142, and the resistor 246. These two current sources function to limit the current through each of the sensing zener diodes 46, 48, thereby preventing the sensing zener diodes 46, 48 from overheating when the AC voltage is excessive.

The sensing circuit 40 comprises a hysteresis circuit 340 that comprises a relay 49 operably connected to a 7.5 volt zener diode 47. The relay 49 is controlled by the timing and control circuit 60 (FIG. 5) and the 7.5 volt zener diode 47 is connected to its contacts. The purpose of the relay 49 and the zener diode 47 is to provide hysteresis. When the relay 49 is not energized, the zener diode 47 is connected in series with a sensing diode 46, thereby raising the undervoltage voltage threshold by 7.5 volts. When the relay 49 is energized, the zener diode 47 is in series with a sensing diode 48, thereby raising the overvoltage threshold by 7.5 volts. Whenever the output terminal 244 is active, the relay 49 is energized by the timing and control circuit 60, thereby providing hysteresis which prevents undervoltage or overvoltage shutdown from occurring inadvertently.

Two optical isolators (opto-isolators) 141, 144 are connected in series with the sensing zener diodes 46, 48. The two opto-isolators 141, 144 provide safe isolation between the high-voltage AC and the low-voltage DC circuitry. When the AC voltage is above the undervoltage threshold, the zener diode 46 conducts, thereby allowing current to pass through the opto-isolator 141. This allows current to pass through the resistor 243 and charge the capacitor 148. As the capacitor 148 charges, it passes a current through the resistor 241 to charge the capacitor 242. This provides a delay of about one second before the signal at the output terminal 244 becomes active. Of course this timing is not limiting of the invention and can be adjusted if needed. If the AC voltage should drop below the undervoltage threshold there will no longer be any current through the opto-isolator 141 and the voltage across the capacitors 148, 242 will be discharged by the resistor 149. The time delay for these capacitors 148, 142 to discharge is long enough to prevent the power conditioning circuit 100 from shutting off if the AC voltage only momentarily drops below the threshold due to an inrush current condition when the load 90 (FIG. 1) is turned on.

When the AC voltage is above the overvoltage threshold the zener diode 48 conducts, thereby allowing current to pass through the opto-isolator 144. When the opto-isolator 144 turns on, the capacitor 242 is discharged within 2 milliseconds, thereby deactivating the signal at the output terminal 244 faster than one half cycle of 60 Hz AC, which is approximately 8.3 ms. Therefore, if there should be an overvoltage condition, the output signal will shut off within the same half-cycle of AC.

Figure 5:
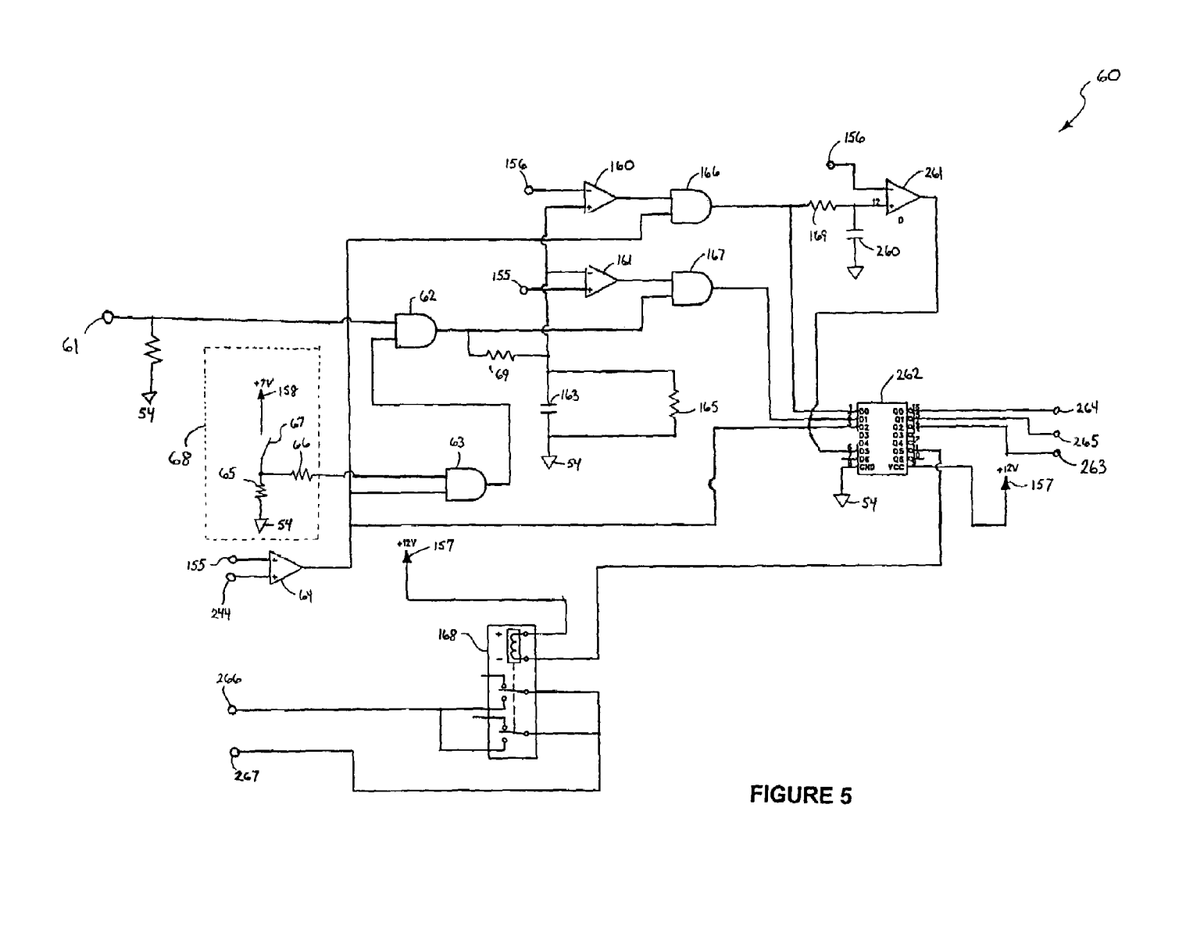
FIG. 5 is a schematic of an exemplary timing and control circuit for use in the power conditioning system of FIG. 1 according to one embodiment of the present invention.

Referring now to FIG. 5, an exemplary timing and control circuit 60 for use in the power conditioning system 100 is illustrated according to one embodiment of the present invention. The purpose of the timing and control circuit 60 is to control the relays 82, 83, 84 of the exemplary inrush suppression/voltage disconnect relay circuit 80, and to control the hysteresis relay 49 of the sensing circuit 40 (FIG. 4). The preferred embodiment includes remote control, inrush current limiting, overvoltage shutdown and undervoltage shutdown functions in one control circuit in order to minimize cost and complexity. However, those skilled in the art will appreciate that other embodiments are possible where each function has a separate control circuit.

The circuitry of the timing and control circuit 60 is powered by the +7V connection 158 from the power supply 50. The functioning of the timing and control circuit 60 is based around four operational amplifiers 64, 156, 160 and 161 (known commercially as Op-Amps) and four quadruple 2-input AND gates 62, 63, 166 and 167. An octal darlington driver 262 provides current to operate the relay coils and includes suppression diodes (not illustrated) to suppress back-EMF that may be generated when the relay coils are de-energized. The output of the sensing circuit enters at node 244, which is connected to the positive input of the Op-Amp 64 and the negative input is connected to the reference voltage at node 155. When the AC voltage is within the normal range, the positive terminal 244 rises above the reference voltage supplied at node 155, which is approximately 3.6 volts, the output of the Op-Amp 64 goes positive and enables the AND gates 63 and 166. Q2 of driver 262 is also activated, thereby supplying current to the AC relay coil 86 (FIG. 6) and hysteresis relay coil 147 (FIG. 4) via the port 263. Thus, the relays 82, 49 are activated only when the AC voltage supplied to the power conditioning circuit 100 is within the normal range.

The circuit 68 function as the power on/off circuit. When the power switch 67 is closed, the +7V from node 158 is applied to the AND gate 63, which allows its output to go high. This in turn enables the AND gate 62. The terminal 61 is the remote activation terminal fro connection to the remote activation unit 70 (FIG. 1) and can be energized by a +5V logic signal. Other voltages can be used to energize the circuit by using a simple potential divider made by using suitable resistors. It is also possible to energize the circuit by connecting a switch from the terminal 61 to the +7V node 158 or by connecting a logic signal from a separate circuit such as a TCP/IP (Internet Protocol) port (see FIG. 7). The output of the AND gate 62 will therefore be high only when three conditions are met: (1) the AC voltage is within the predetermined threshold/normal range; (2) the power switch 67 is on; and (3) the remote activation terminal 61 is high.

The output of the AND gate 62 is connected to the timing circuit which consists of the resistor 69, the capacitor 163, and the resistor 165. The resistors 69, 165 form a potential divider which provides an aiming voltage of approximately 5.1 volts, and combined with the capacitor 163 produces a time constant of approximately 0.5 second. The timing circuit is connected to the negative input of the Op-Amp 161 and the positive input of the Op-Amp 160. The positive input of the Op-Amp 161 is connected to the voltage reference 155 which is approximately 3.6 volts, and the negative input of the Op-Amp 160 is connected to the voltage reference 156 which is approximately 3.0 volts.

When the output of the AND gate 62 is low, the voltage on the timing circuit is close to zero, the output of the Op-Amp 161 is high, and the output of the Op-Amp 160 is low. When the output of the AND gate 62 goes high, the voltage of the timing circuit rises and the output of the AND gate 167 goes high. This activates Q1 of the driver 262, thereby supplying current to the AC relay coil 181 via the port 265. After approximately 0.5 second the voltage on the timing circuit reaches approximately 3.0 volts and the output of the Op-Amp 160 goes high. This causes the output of AND gate 166 to go high activating Q0 of driver 262 and supplying current to AC relay coil 88 via port 264. After approximately 0.1 second further the voltage on the timing circuit reaches approximately 3.6 volts and the output of Op-Amp 161 goes low, causing the output of the AND gate 167 to also go low. This de-activates Q1 of the driver 262 which de-energizes the AC relay coil 181 via the port 265. The logic is designed so that if the sensing circuit output 244 should go low at any time indicating that the AC voltage is out of range, all relay coils will be immediately de-energized.

The purpose of the relay 168 is to provide contacts for customer use which indicate that the AC output of the product is active. These contacts can be used to communicate feedback to a piece of control equipment or to connect to another identical piece of equipment for the purpose of cascading units together. In this way, an unlimited number of units can be cascaded together. The Op-Amp 261 in combination with the resistor 169 and the capacitor 260 provide an additional 0.5 second delay so that the relay 168 has a total turn-off and turn-on delay of approximately 1.0 second. The Op-Amp 261 uses the reference voltage 156 to provide a suitable on/off threshold and Q5 of the driver 262 supplies current to the relay 168.

Figure 6:
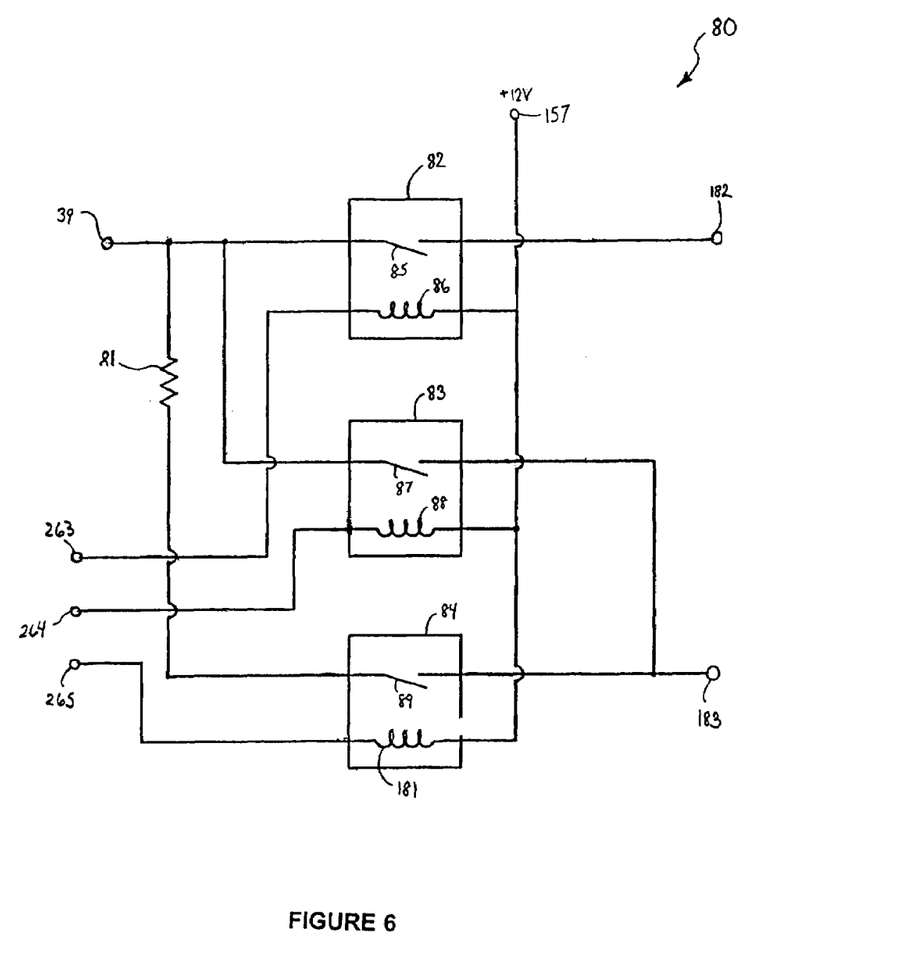
FIG. 6 is a schematic of an exemplary inrush suppression and voltage disconnect relay circuit for use in the power conditioning system of FIG. 1 according to one embodiment of the present invention.

Referring now to FIG. 6, an exemplary inrush current suppressor/voltage disconnect relay circuit 80 for use in the power conditioning system 100 is illustrated according to one embodiment of the present invention. The inrush current suppressor/voltage disconnect relay circuit 80 comprises three relays 82, 83, and 84. The three relays 82, 83, and 84 are chosen to be capable of turning the AC power off and onto the load circuit 90 (FIG. 1). Each relay 82-84 has one coil 86, 88, 181 and one normally-open, single-pole contact 85, 87, 89. One side of each relay coil 86, 88, 181 is connected to the +12 volt supply 157 and the other side is controlled and energized by the timing and control circuit 60 (FIG. 5).

The resistor 81 is a resistor that is chosen to be able to withstand 120V AC for 0.5 second. The purpose of the resistor 81 is to limit the inrush current at the output 183 when it is activated. The output 182 does not have inrush limiting and is designed to be active whenever the AC voltage is within the normal/operating range as determined by the sensing circuit 40. The coil 86 is energized through the port 263, thereby causing the contact 85 to close. The current supplied from the input port 39 is therefore allowed to pass to the output port 182. The output 183 is designed to be active only when three conditions are met: (1) the AC voltage is within the normal/operating range as determined by the sensing circuit 40 (FIG. 4); (2) the power switch 65 (FIG. 5) is on; and (3) the remote activation input 61 is active (FIG. 5).

When all three conditions are met, a timing sequence initiated by the timing and control circuit 60 controls the relays 83, 84 in a precise way. Firstly, the relay coil 181 is energized through the port 265, thereby causing the contact 89 to close. This allows AC current to pass from the input port 39, through resistor 81, and to the output port 183. After approximately 0.5 seconds, the relay coil 88 is also energized through the port 264, thereby causing the contact 87 to close. The current supplied from the input port 39 is therefore allowed to pass directly to the output port 183 bypassing the resistor 81. After approximately a further 0.1 second, the relay coil 181 is de-energized, causing the contact 89 to open. The purpose of this is to prevent the resistor 81 from overheating should the contact 87 fail to close for any reason. In this way, the AC current at the output port 183 is current limited for the first 0.5 seconds and then, after that time, the full AC current potential is available.

Figure 7:
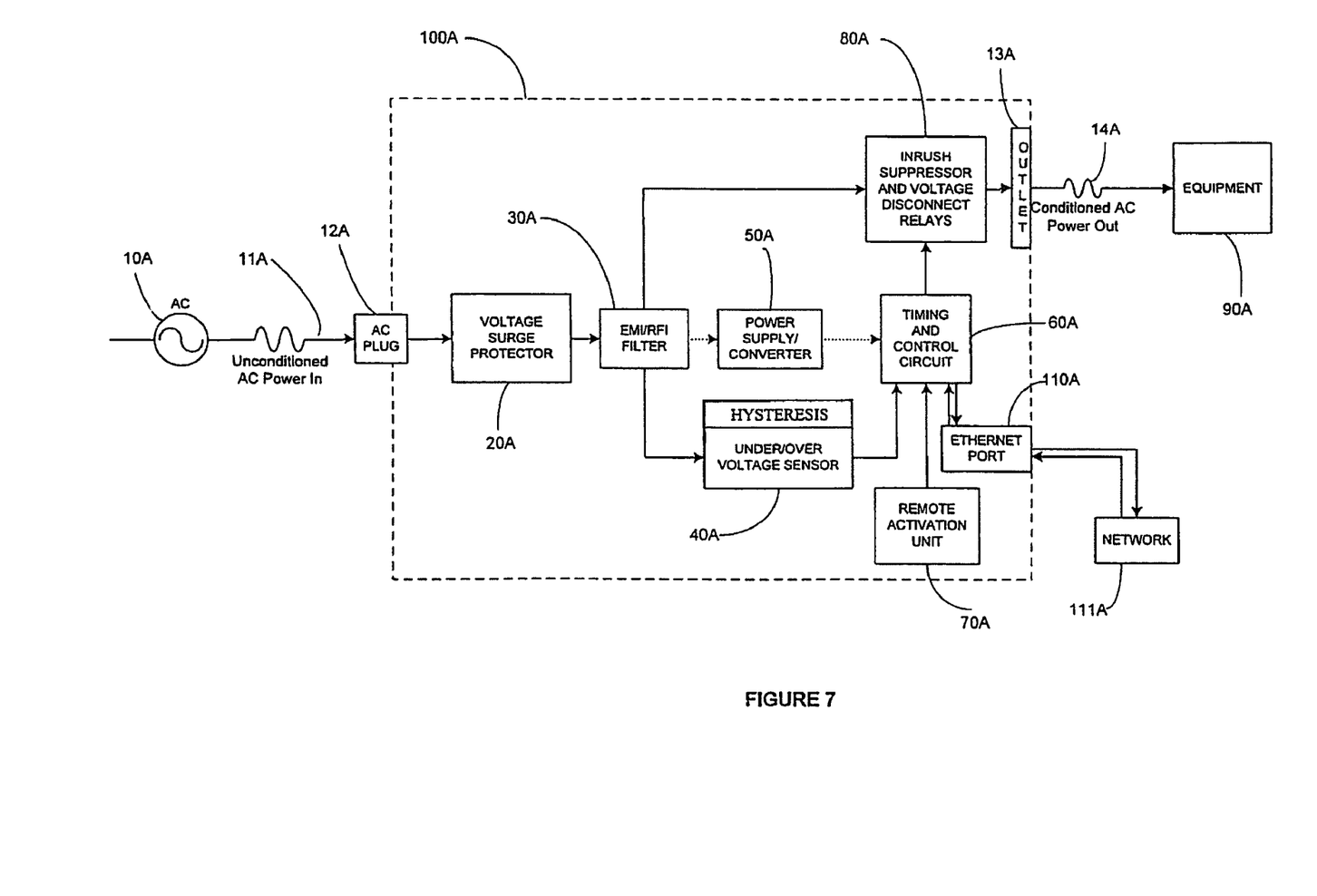
FIG. 7 is a schematic of a power conditioning system according to a second embodiment of the present invention coupled to an alternating current power source and a piece of equipment, wherein the power conditioning system comprises network control. capabilities.

Referring now to FIG. 7, a power conditioning system 100A is illustrated according to a second embodiment of the present invention. The power conditioning system 100A is identical to that of the power conditioning system 100 of FIG. 1 with the exception that power conditioning system 100A has internet protocol ("IP") control capabilities. A detailed discussion of those components of the power conditioning system 100A that are substantially identical to that of the power conditioning system 100 is omitted in order to avoid redundancy. However, for reference, like numbers are used to identify like parts with the exception of the alphabetical suffix "A" being added.

The power conditioning system 100A comprises an Ethernet port 110 for connecting the power conditioning system 100A to a network 111A, such as the internet. Other suitable networks can include local area networks, wide area networks, or intranets. The Ethernet port 110A is operably coupled to the control circuit 60A and preferably resides within the housing of the power conditioning system 100A. The internal circuitry of the control circuit 60 is coupled to the Ethernet port 60A in a manner well known in the art. An ethernet cable or other communication line can be used couple the Ethernet port 110A to the network 111A. Alternatively, a wireless connection can be established. Moreover, while an Ethernet port is illustrated as providing the means to couple the power conditioning system 100A to the network, other hardware can be used, such as a phone jack, a firwire port, etc.

The control circuit 60A, or other component of the power conditioning system 100A, is programmed with the proper software to facilitate communication, monitoring, and control of the power conditioning system 100A via the network 111A from a remote location. As can be seen from the arrows in FIG. 1 the control circuit 60A both receives and transmits data to the network 111A via the Ethernet port 110A this allows a user to monitor and control the power conditioning system 100A from a network portal/interface, such as an internet site or the like.

While the invention has been described and illustrated in detail, various alternatives and modifications will become readily apparent to those skilled in the art without departing from the spirit and scope of the invention. Specifically, the invention can take on a wide variety of embodiments that omit one or more of the components illustrated in FIGS. 1 and 7. For example, in some embodiments, the invention can be a system for conditioning an AC power transmission that comprises only the voltage surge protector, the inrush current suppressor, and the network connection means. In a further example, the invention can be a system comprising only the voltage surge protector, the voltage sensing circuit, and the network connection means.

What is claimed is:

1. A system for conditioning an alternating current ("AC") power transmission for supply to a load circuit, the system comprising:
   a power conditioning circuit comprising a voltage surge protector for eliminating voltage spikes in the AC power transmission, a voltage sensing circuit for monitoring a voltage level of the AC power transmission, and a hysteresis circuit comprising a zener diode operably connected to a relay that controls an overvoltage hysteresis range having an upper limit and a lower limit;
   means for electrically coupling the power conditioning circuit to a source of AC power;
   outlet means for electrically coupling the power conditioning circuit to a load circuit;
   the power conditioning circuit adapted so that: (i) upon the voltage sensing circuit detecting that the voltage level of the AC power transmission exceeds an upper limit of the overvoltage hysteresis range, the AC power transmission is prohibited from reaching the outlet means; and (ii) if the AC power was prohibited from reaching the outlet means as a result of the voltage sensing circuit detecting that the voltage level of the AC power transmission exceeded the upper limit of the overvoltage hysteresis range, the AC power transmission is restored to the outlet means upon the voltage sensing circuit detecting that the voltage level of the AC power transmission falls below the lower limit of the overvoltage hysteresis range.

2. The system of claim 1 wherein the zener diode and the relay of the hysteresis circuit also controls an undervoltage hysteresis range having an upper limit and a lower limit; and wherein the power conditioning circuit further comprises one or more switches and a controller, the controller operably coupled to the voltage sensing circuit and the one or more switches, the controller adapted to (i) transmit a disconnect signal to the one or more switches upon the voltage sensing circuit detecting that the voltage level of the AC power transmission exceeds the upper limit of the overvoltage hysteresis range, thereby prohibiting the AC power transmission from reaching the outlet means; and (ii) transmit a disconnect signal to the one or more switches upon the voltage sensing circuit detecting that the voltage level of the AC power transmission falls below the lower limit of the undervoltage hysteresis range, thereby prohibiting the AC power transmission from reaching the outlet means.

3. The system of claim 2 further comprising:
an inrush current suppressor comprising the one or more switches; and
wherein the one or more switches are adapted to limit the current of the AC power transmission reaching the outlet means during an inrush current condition without disconnecting the AC power transmission from reaching the outlet means.

4. The system of claim 2 wherein the power conditioning circuit further comprises a converter for creating direct current ("DC") power from the AC power transmission, the converter operably coupled to the controller for supplying DC power to the controller.

5. The system of claim 2 wherein the power conditioning circuit further comprises a remote activation unit coupled to the controller.

6. The system of claim 1 wherein the power conditioning circuit further comprises a filter for reducing electromagnetic interference and radio frequency interference of the AC power transmission.

7. The system of claim 1 further comprising:
an inrush current suppressor for limiting current of the AC power transmission;
wherein the voltage surge protector is coupled directly to the means for electrically coupling the power conditioning circuit to the source of AC power, thereby producing a surge protected AC power transmission;
wherein the inrush current suppressor receives the surge protected AC power transmission and limits the current associated with the surge protected AC power transmission, thereby producing a conditioned AC power transmission;
wherein the voltage sensing circuit monitors the voltage level of the surge protected AC power transmission; and
the outlet means receiving the conditioned AC power transmission.

8. The system of claim 1 further comprising means for coupling the power conditioning circuit to a network thereby facilitating monitoring and/or control of the power conditioning circuit from a remote location via a network portal.

9. The system of claim 1 further comprising a housing, the power conditioning circuit located within the housing.

10. The system of claim 1 wherein the outlet means comprises a plurality of AC outlets.

11. The system of claim 1 wherein the means for electrically coupling the power conditioning circuit to a source of AC power comprises a plug.

12. The system of claim 1 wherein the means for electrically coupling the power conditioning circuit to a source of AC power comprises a jack for receiving a plug.

13. The system of claim 1 wherein the power conditioning circuit further comprises a remote activation unit.

14. The system of claim 1 further comprising an inrush current suppressor comprising one or more relay switches, and wherein the AC power transmission is prohibited from teaching the outlet means by manipulation of the one or more switches.

15. The system of claim 1 further:
wherein the hysteresis circuit also controls an undervoltage hysteresis range having and upper limit and a lower limit; and
wherein the voltage sensing circuit continues to monitor the voltage level of the AC power transmission after the AC power is prohibited from reaching the outlet means; and the power conditioning circuit further adapted so that: (ii) upon the voltage sensing circuit detecting that the voltage level of the AC power transmission is below a lower limit of the undervoltage hysteresis range, the AC power transmission is prohibited from reaching the outlet means; and (iii) if the AC power was prohibited from reaching the outlet means as a result of the voltage sensing circuit detecting that the voltage level of the AC power transmission was below the lower limit of the undervoltage hysteresis range, the AC power transmission is restored to the outlet means upon the voltage sensing circuit detecting that the voltage level of the AC power transmission rises above an upper limit of the undervoltage hysteresis range.

16. The system of claim 1 further comprising:
an inrush current suppressor comprising one or more switches;
means for coupling the power conditioning circuit to a network thereby facilitating monitoring and/or control of the power conditioning circuit from a remote network portal;
wherein one or more switches are adapted to (1) limit the current of the AC power transmission reaching the outlet means during an inrush current condition without disconnecting the AC power transmission from reaching the outlet means; and (2) prohibit the AC power transmission from reaching the outlet means upon the voltage sensing circuit detecting that the voltage level of the AC power transmission exceeds the upper limit of the overvoltage hysteresis range; and
a housing, the power conditioning circuit located within the housing.

17. The system of claim 1 wherein the power conditioning circuit is adapted so that the AC power transmission is prohibited from reaching the outlet means only when the voltage sensing circuit detects the voltage level of the AC power transmission to exceed the upper limit of the overvoltage hysteresis range for a sustained period of time.

18. The system of claim 17 wherein the sustained period of time is of a sufficient length so that surges and transients in the AC power transmission do not cause the AC power transmission to be prohibited from reaching the outlet means.

19. The system of claim 17 wherein the sustained period of time is a discharge time for a capacitor.

* * * * *